United States Patent [19]

Yewen

[11] Patent Number: 4,663,625

[45] Date of Patent: May 5, 1987

[54] PASSIVE TAG IDENTIFICATION SYSTEM AND METHOD

[75] Inventor: Robert G. Yewen, Pickering, Canada

[73] Assignee: Motion Magnetics Inc., Rexdale, Canada

[21] Appl. No.: 811,743

[22] Filed: Dec. 20, 1985

Related U.S. Application Data

[63] Continuation of Ser. No. 556,702, Nov. 30, 1983, abandoned.

[51] Int. Cl.$^4$ .............................................. H04Q 1/00
[52] U.S. Cl. ................................. 340/825.54; 235/439; 340/825.34; 342/44; 342/51
[58] Field of Search ................. 340/539, 572, 825.54, 340/825.3–825.34, 825.69, 825.72; 361/402; 235/439; 343/6 R, 6.5 R, 6.5 LC–6.8 LC

[56] References Cited

U.S. PATENT DOCUMENTS

| | | | |
|---|---|---|---|
| 3,115,622 | 12/1963 | Jaffe | 340/539 |
| 3,185,947 | 5/1965 | Freymodsson | 361/402 X |
| 3,299,424 | 1/1967 | Vinding | 235/439 X |
| 3,618,059 | 11/1971 | Allen | 340/539 |
| 3,720,940 | 3/1973 | Fox | 343/6 R |
| 3,754,226 | 8/1973 | Fearon | 340/572 |
| 3,780,368 | 12/1973 | Northeved et al. | 343/6.5 SS |
| 3,832,530 | 8/1974 | Reitboeck et al. | 235/439 |
| 3,859,624 | 1/1975 | Kriofsky et al. | 343/6.5 R X |
| 3,898,619 | 8/1975 | Carsten et al. | 340/825.54 |
| 4,021,705 | 4/1977 | Lichtblau | 361/402 |
| 4,065,753 | 12/1977 | Paul | 340/825.54 |
| 4,074,249 | 2/1978 | Minasy | 340/572 |
| 4,095,214 | 6/1978 | Minasy | 340/552 |
| 4,134,538 | 1/1979 | Lagarde | 235/449 |
| 4,222,517 | 9/1980 | Richardson | 235/493 |
| 4,242,671 | 12/1980 | Plows | 340/572 |
| 4,274,083 | 6/1981 | Tomoeda | 340/171.7 |
| 4,336,531 | 6/1982 | Kincaid | 340/568 |
| 4,342,904 | 8/1982 | Onsager | 235/493 |
| 4,353,064 | 10/1982 | Stamm | 340/825.69 X |

OTHER PUBLICATIONS

P. M. Peterson, "Potential Use for Electronic Identification", Mini-Review 77-1, Feb. 1977.
D. M. Holm, "Agricultural Use of Electronic Identification", Mini-Review 76-2, Sep. 30, 1977.

Primary Examiner—Ulysses Weldon
Attorney, Agent, or Firm—George A. Rolston

[57] ABSTRACT

An identification system to be used in association with a set of objects or persons whereby any member of the set may be automatically identified while the member is located within a predetermined interrogation zone, wherein the system has an oscillator and field coils by which an oscillating electromagnetic field is established in the interrogation zone, an identification tag associated with each member of the set of objects or persons, each tag having a core strip of magnetically responsive material of a type which abruptly reaches saturation at a predetermined level of magnetic field, an electromagnetic coil wrapped around the strip, a switch connected with the coil, electronic circuitry for controlling the opening and closing of the switch according to a sequence in timed relation to the half cycles of the electromagnetic field, which sequence defines an identification code for the tag, and a first antenna connected to the circuitry where the circuitry may be operated by power derived from the electromagnetic field, a field detector for detecting and making measurements of the electromagnetic field in the interrogation zone, and a decoder for determining the identity of a tag according to the measurements.

8 Claims, 7 Drawing Figures

PASSIVE TAG IDENTIFICATION SYSTEM AND METHOD

This invention relates to a passive electromagnetically activated electronic transponder identification tag, and to an identification method and apparatus using such a tag. This application is a continuation in part of application Ser. No. 556,702, Identification Device, Inventor Robert G. Yewen, Filed Nov. 30, 1983 now abandoned.

BACKGROUND OF THE INVENTION

Many systems are known for automatically determining whether an object or person is passing a predetermined location and whether such object or person is authorized to pass such location. If such passage is authorized, the object or person may continue unhindered. If such passage is not authorized, action may be taken for its prevention.

Such systems are often used in theft security systems. A special security tag is placed upon an object, such as an article for sale in a store. If a thief attempts to remove the article from the store, detectors located at the store exits will determine the presence of the tag. Alarms indicate to security personnel that a theft is being committed and the thief may be apprehended. If the article is paid for by a legitimate customer, the tag is removed, deactivated or changed at a check-out station, so that no tag is detected by the detectors at the store exits.

Other applications of such systems may occur in mail or luggage handling systems and personnel and livestock detection or counting systems.

Examples of such applications, systems and associated devices are disclosed in U.S. Pat. Nos. 3,618,059, 3,720,940, 3,754,226, 4,021,705, 4,074,249, 4,095,214, 4,222,517, 4,242,671, 4,274,083, 4,336,531 and 4,342,904.

Some detection systems make use of tags having permanent magnets or radioactive material. Tags with permanent magnets are bulky and heavy. Tags using radioactive material pose health risks. Other systems (e.g., U.S. Pat. No. 4,252,671) may require a piezoelectric tag which retransmits a delayed signal. Yet other systems (e.g., U.S. Pat. Nos. 3,720,940 and 4,021,705) may use a tag having a resonant electronic circuit for retransmitting a generated signal. Some U.S. Pat. Nos. 3,754,226, 4,074,249 and 4,222,517 disclose the use of electromagnetically activated passive signal generator tags. All of the above devices generally can only be used to determine the presence or non-presence of a tag. They cannot determine the specific identity of the tagged object.

It is desirable to have a system not only for detecting objects or persons, but also for automatically identifying same. Such an automatic identification system makes possible a more flexible, less labour-intensive, less expensive mail, baggage or material handling system and more reliable livestock and personnel identification. Other applications for identification systems may be possible.

Examples of such identification systems are disclosed in U.S. Pat. Nos. 3,115,622, 3,618,059, 3,832,530, 4,134,538 and 4,274,083.

Some identification systems (e.g., U.S. Pat. Nos. 3,115,622, 3,618,059 and 4,274,083) disclose the use of an active, battery-operated radio transmitter. Such devices identify a tagged object by detection of a unique radio signal emanating from the transmitter on the tag. However, radio transmitter devices may be expensive. They may also be inconvenient and unreliable because of the limited useful battery life.

The system disclosed in U.S. Pat. No. 3,832,530 depends upon the existence of current pulses in and the absorption of energy within an electronic circuit affixed to a tag. Such current pulses induce voltage pulses in a detector circuit. The current pulses of the tag can be uniquely coded to identify the tagged object. Such a system requires a high degree of sensitivity so as to be able to distinguish small increments of energy absorption in the circuit corresponding to different identification codes.

The system disclosed in U.S. Pat. No. 4,134,538 makes use of electromagnetically activated, passive signal generator tags. Such tags require the selection and dimensioning of magnetic material to provide unique generated signals for each tag to, thus, uniquely identify the tagged object. A disadvantage of such system is that it is difficult to select and size the necessary magnetic material so that the tag will generate a signal capable of being uniquely and reliably distinguishable from the signals of other tags. Such a tag may also be somewhat bulky and cumbersome if the system must have the capacity to handle a large number of objects to be identified.

It is therefore desirable to provide an identification system which is inexpensive, reliable, convenient to use, uses a tag of convenient size, has long life, and has the capacity to handle various numbers of objects that are likely to be required to be handled.

STATEMENT OF THE INVENTION

With a view to overcoming the above-noted problems and to providing the advantages discussed, the invention comprises a method, a system and a device for the automatic identification of any member of a set of objects or persons to be identified. The device is an identification tag to be used on an object or person to be identified, in association with an identification system which system establishes an oscillating electromagnetic field within a predetermined interrogation zone, said tag comprising a core strip of magnetically responsive material of a type which abruptly reaches saturation at a predetermined level of magnetic field, an electromagnetic masking coil wrapped around said strip, switch means in circuit with said coil, electronic circuitry means for controlling opening and closing of said switch means according to a predetermined sequence in timed relation to the oscillations of the electromagnetic field, which sequence defines an identification code for the tag, and first antenna means connected to said circuitry whereby said circuitry may be operated by power derived from the electromagnetic field.

The system comprises an oscillator, field coils connected to the oscillator whereby at least one oscillating electromagnetic field is established in an interrogation zone, an identification tag as described above associated with each member of the set of objects or persons, field detection means for detecting and measuring the electromagnetic field, and decoder means to determine the identity of a tag according to the measurements.

The method comprises the operation of the system described above to identify tags, and thus objects or persons and distinguish them from each other.

Accordingly, it is an object of the invention to provide an identification system which is inexpensive, reliable and convenient to use.

It is a further object of the invention to provide an identification system which utilizes a durable identification tag of convenient size which has long life.

It is a further object of the invention to provide an identification system which has the capacity to handle various numbers of objects or persons that are likely to be required to be handled.

In accordance with the invention, the magnetically responsive material in the tag is a material which is saturable, magnetically in a magnetic field of a predetermined strength. When subjected to a magnetic field of this strength, the material undergoes a sudden transition to saturation, and thus a sudden change in its response. This abrupt or sudden change or response can be detected by measuring the overall magnetic field in the interrogation zone. The abrupt changeover produced by saturation of the material will produce a "blip", which is detectable in the presence of the primary field.

In accordance with the invention, the response of the saturable member may be masked, by the effect of the electromagnetic masking coil, when the switch in its circuit is closed.

When the switch is open, and there is therefore no circuit, the masking coil is not in circuit, and thus no masking of the core strip takes place.

The masking coil is switched in and out of circuit in a predetermined sequence, thereby producing a predetermined number of "blips", interspersed with an absence of such "blips".

It is thus possible to provide a unique code of "blips", and absences of "blips", which code can be identified with a particular object or individual unique to the wearer of the tag.

The various features of the novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
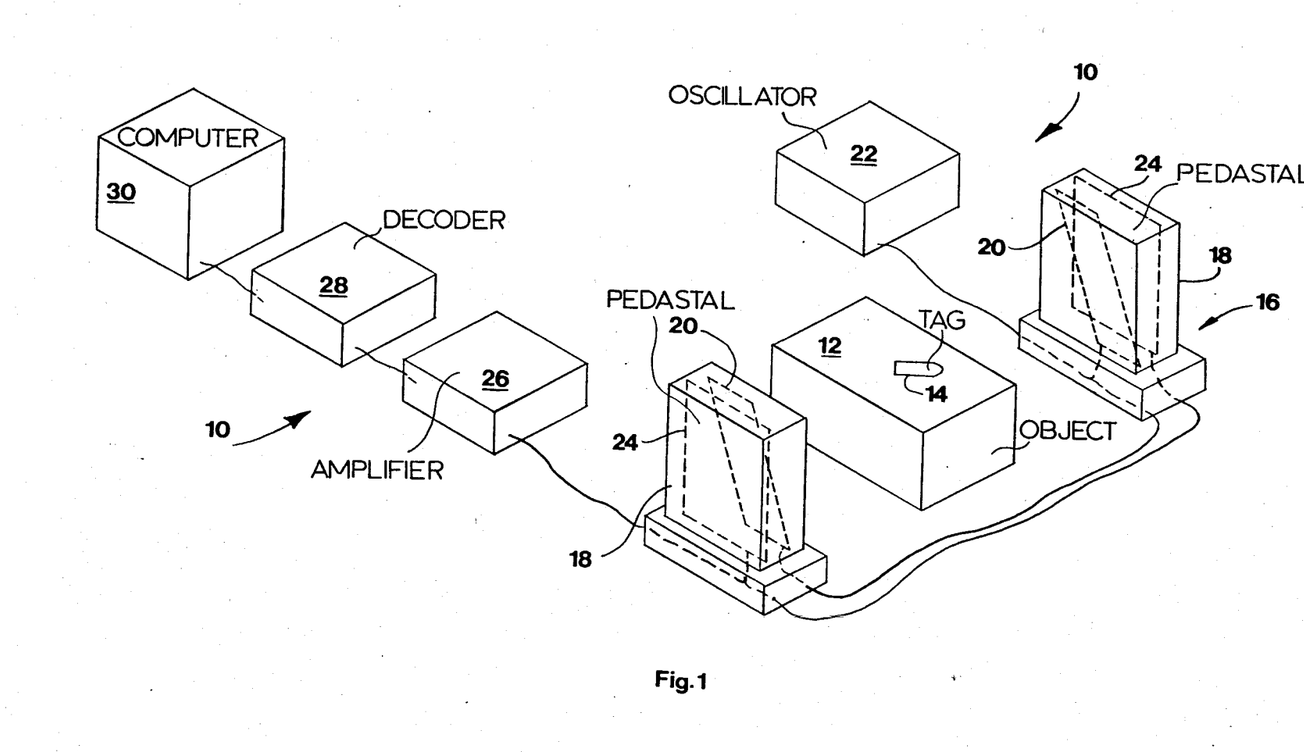
FIG. 1 is a schematic drawing of an identification system according to the invention.

Referring to FIG. 1, an identification system according to the invention is indicated generally as 10. An object or a package 12 passes through system 10. Identification tag 14 is attached to an object or a package 12 and passes through system 10 with package 12. Tag 14 and, thus, package 12, are detected and identified by system 10. The system 10 uses such identity information as required. For instance, such information may be used to operate conveyor belts (not shown) so that package 12 is directed to the appropriate destination. System 10 may merely record the information that a particular package 12 has passed a specific location. Such information may be important to trace the path of an object through a processing system and to determine whethwer certain operations have been carried out on the object.

Such a system would be suitable for handling baggage. The object may of course be an animal, or a person. The tag would then function to identify the individual. It could be used to trace individuals in a building, or the passage of individuals through a facility.

The identification system 10 includes an interrogation gate 16, comprising two pedestals 18 between which package 12 must pass. Gate 16 defines an interrogation zone within which package 12 may be identified. Gate 16 includes at least one pair of electromagnetic field coils 20. One each of coils 20 is located in each pedestal 18. Such coils and pedestals are well-known in the art. More detailed descriptions of such coils as used in identification systems may be found in U.S. Pat. Nos. 3,754,226, 3,832,530 and 4,074,249. In order to improve the detection capabilities of system 10 to the passage of a tag at different orientations relative to the coils, gate 16 may include two or three mutually orthogonal pairs of electromagnetic field coils 20.

Figure 4:
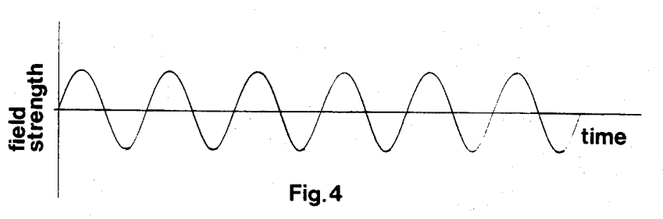
FIG. 4 is a graphical representation of the electromagnetic field prior to passage of a tag according to the invention.

Field coils 20 are electrically connected to field oscillator 22. Oscillator 22 takes power from a power source (not shown) and establishes an oscillating electromagnetic field between pairs of coils 20. Generally, such an oscillator 22 will establish an electromagnetic field which oscillates at a predetermined frequency. Such oscillators 22 are conventional devices well-known in the electrical arts. FIG. 4 presents a graphical representation of the electromagnetic field, as it may be established by oscillator 22.

Gate 16 further includes an antenna coil 24 for receiving signals from field coils 20 and responses which may be emitted by tag 14 as it passes through the electromagnetic field. Antenna 24 is electrically connected to a signal amplifier 26, which in turn is connected to decoder 28. Antenna 24, amplifier 26 and decoder 28 may all be standard components, well understood in the art.

The output of decoder 28 is an electrical signal, corresponding to the identity of package 12. Such a signal, and other signals (such as, for example, a time signal), may be inputted to computer 30. Computer 30 may simply store such information or computer 30 may, according to its programming, issue instructions to other devices (not shown) to control further movement of package 12. Of course, the output of decoder 28 may be fed to a suitable indicator (not shown) for visually displaying the identity of package 12. Appropriate manual action could then be taken, either in conjunction with or to over-ride any action taken by computer 30.

All of the above components, except tag 14, of identification system 10 are essentially standard and are well known in the art. Such components are described only in order that the invention may be better understood, and not in order to limit the scope of the invention in any way. Rather, it is the intention that the scope of the invention covers any detection or identification system using an identification tag according to the invention.

Figure 2:
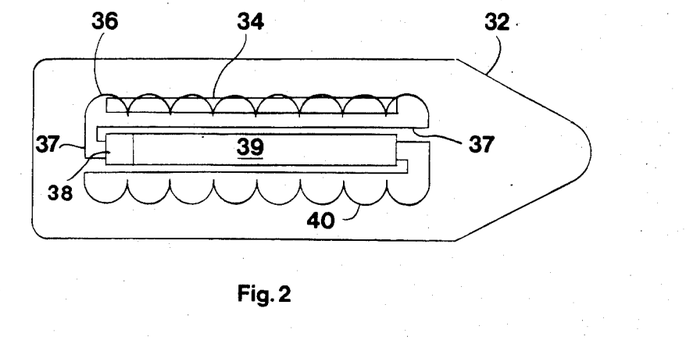
FIG. 2 is a schematic diagram of one embodiment of an identification tag according to the invention.

Referring to FIG. 2, tag 14 comprises a base 32 to which is affixed or in which is embedded a strip 34 of magnetically responsive material. Such material may conveniently be a ferromagnetic alloy of nickel, molybdenum, iron and manganese (commonly referred to as supermalloy). Other ferromagnetic materials having a coercivity ranging between 0.1 Oersteds and 0.01 Oersteds may be equally suitable.

This type of material has the property of high permeability in a magnetic field. It further has the property of reaching an abrupt level of magnetic saturation at a predetermined level of magnetic field within the material.

When it reaches saturation there is an abrupt change in permeability. Permeability rises suddenly to a peak and then falls off sharply. For the purposes of this explanation, the precise level or intensity of magnetic field is not relevant, and is refered to herein as X Gauss. This is the level of magnetic field at which a given sample of the material abruptly becomes saturated.

The level will vary from one material to another, and also depending upon the size and shape of the strip 34, as is well understood in the art.

The abrupt transition to saturation, at the saturation point of the material results in a measurable electromagnetic response, which will produce a measurable signal in the presence of the primary oscillating field. A response signal would normally be detectable on each half cycle of the field.

Wrapped around strip 34 is electromagnetic masking coil 36. Coil 36 is electrically connected by line 37 to solid state masking relay switch, indicated generally as 38.

When switch 38 is open, no current can flow in masking coil 36. Switch 38 is operated by electronic circuitry, indicated generally as 39, which in turn is electrically connected to a tag antenna 40. The oscillating electromagnetic field through which tag 14 passes induces corresponding alternating current in the tag antenna 40. Such current is used to power circuitry 39.

Such current is induced solely as a response to the oscillating field, and will of course cease as soon as the tag is removed from the field, or if the field should be switched off for some reason.

Normally the oscillating electromagnetic field is on continuously.

Figure 3:
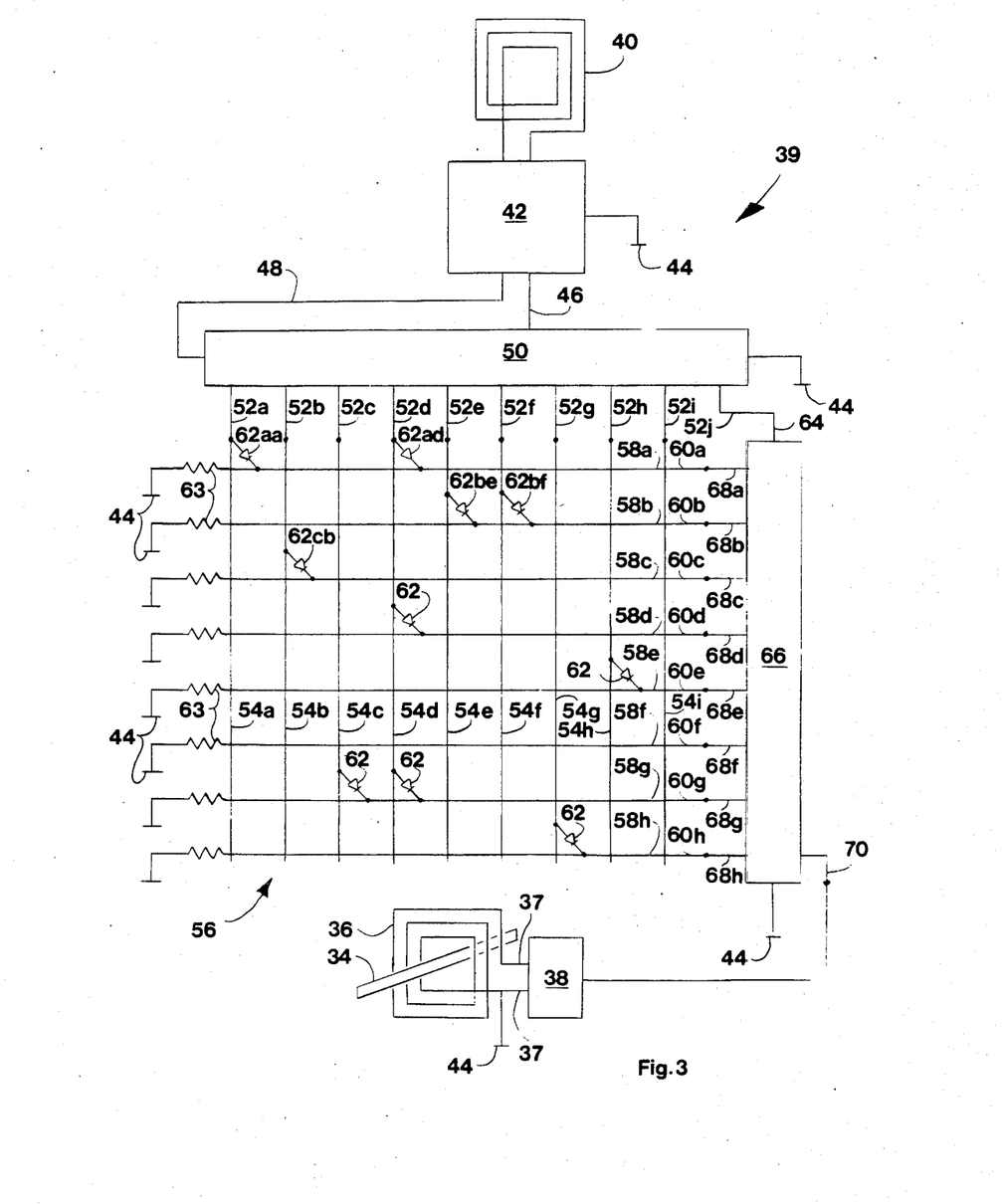
FIG. 3 is a schematic diagram of the electronic circuitry of the tag of FIG. 2.

Referring to FIG. 3, circuitry 39 includes a rectifier and voltage stabilizer circuit 42 which is connected to antenna 40. Circuit 42 establishes a substantially constant voltage output across two output terminals. The circuitry 39 of tag 14 cannot conveniently be grounded. However, circuitry 39 may define a common point, which, insofar as the operation of circuitry 39 is concerned, acts in a fashion similar to a ground. For convenience, one of the two output terminals of rectifier and stabilizer 42 is defined to be such a common point and is named voltage source terminal 44. The other of the two outut terminals of circuit 42 is defined to be a voltage drain terminal 46.

Rectifier and stabilizer 42 also defines a clock signal. A voltage pulse is generated for each half cycle of the current in antenna 40. Such voltage is defined across voltage source terminal 44 and a third output terminal of rectifier and stabilizer 42, namely clock terminal 48.

Voltage drain terminal 46 and clock terminal 48 are electrically connected to integrated circuitry decade counter chip 50. Chip 50 is also connected to voltage source terminal 44. Chip 50 functions similarly to a series of ten electronic switches (not shown). Each such switch connects voltage drain terminal 46 to one of ten counter clip output terminals 52a to 52j. A single voltage pulse of the clock signal from clock terminal 48 causes one of such switches to close and, more or less simultaneously, a previously closed switch to open, allowing the voltage drain signal to pass to the particular output terminal 52 associated with such switch. A subsequent voltage pulse from clock terminal 48 will cause the same switch to open and a subsequent switch to close. A further clock signal will cause a next switch to operate in identical fashion. A series of ten voltage pulses will cause each of the switches to close and open once. A subsequent pulse will cause the switch last closed to open and the first switch to close a second time. The entire sequence will subsequently be repeated.

Each of counter chip output terminals 52a to 52i is connected to a column line 54 of identification code matrix 56. Matrix 56 also includes a series of frow lines 58, the ends of which define matrix output terminals 60. Column lines 54 and row lines 58 may be electrically connected by one or more diodes 62, but otherwise are not connected. The specific positioning of such diodes 62 to join certain column lines 54 and row lines 58 define a particular identification code, as explained below. Each of matrix row lines 58 is connected through resistors 63 to voltage source terminal 44 in order to provide a path to source terminal 44 for stray currents when no voltage drain signal is present in row lines 58.

The remaining counter clip output terminal 52j is connected to index terminal 64 to integrated circuitry data selector chip 66. Matrix output terminals 60 are connected to a series of selector chip input terminals 68. Selector chip 66 is also connected to voltage source terminal 44. Selector chip 66 functions in similar fashion to counter chip 50. Chip 66 functions similarly to a series of electronic switches (not shown) each connecting a selector chip input terminal 68 to selector chip output terminal 70. A signal from counter chip output terminal 52j causes one of such switches to close and, more or less simultaneously, a previously closed switch to open. A subsequent signal from terminal 52j causes such first switch to open and a subsequent switch to close. Thus, signals arriving from terminal 52j will cause the switches of selector chip 66 to consecutively close and open. After the last switch is opened, the cycle will commence again at the first switch.

Selector chip output terminal 70 is connected to solid state relay switch 38 in line 37. Each time a signal (which will correspond to the signal in voltage drain terminal 46) appears at output terminal 70 switch 38 will close, thus allowing alternating current induced in coil 36 by the passage of tag 14 through the electromagnetic field to flow. Line 37 is also connected to voltage source terminal 44.

All of the above components, namely the rectifier and stabilizer 42, the decade counter chip 50, the identification code matrix 56, the selector chip 66, and switch 38 are well-known and understood in the art.

In operation, the tag 14 will be passed through the oscillating electromagnetic field generated at gate 16 between pedestals 18. The peaks of each half cycle of the magnetic field in this zone are greater than the intensity required to produce abrupt saturation of strip 34. When switch 38 is open, current cannot be induced in coil 36 and response strip 34 is free to respond unhindered to the influence of the electromagnetic field.

Figure 5:
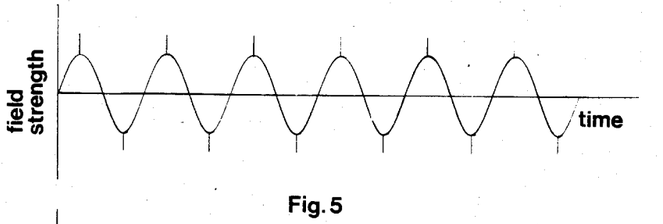
FIG. 5 is a graphical representation of the electromagnetic field during passage of a piece of a response member as used in a tag according to the invention.

Each half cycle of the electromagnetic field thus causes both a reversal of the magnetic polarization of response strip 34 and also causes an abrupt saturation of the strip 34. Each such reversal and saturation affects the electromagnetic field itself, in a gradual and then abrupt manner. As the field intensity rises from zero, the strip causes a gradual distortion of the field. When the abrupt saturation takes place there is an abrupt distortion which has the effect of adding an impulse signal or "blip" to the field (see FIGS. 4 and 5). Such "blips" are detectable by the field detection system, namely antenna 24, amplifier 26 and decoder 28. It will be appreciated such impulse signals or "blips" will occur only during the existence of the primary oscillating electromagnetic field. Accordingly, it is of particular significance to the invention that such signals are detectable by the field detection system during the presence of the primary field.

The signals detected by the detection coil will be processed so as to as far as possible cancel out the primary field response and enhance the coded pulses or "blips" from the response member 34.

It will of course be appreciated that the generation of such signals or "blips" in accordance with the invention is dependent upon the continued oscillation of the primary field, which in turn is responsible for the generation both of the alternating current in the tag antenna 40 and also for the generation of a response in the strip 34 itself.

Thus assuming the switch remains open, then each half cycle of the primary field will produce a complimentary response signal or "blip" caused by the strip 34.

However, when switch 38 is closed, alternating current is induced in coil 36, by the primary electromagnetic field. The alternating current in turn induces its own electromagnetic field which effectively cancels or at least reduces the primary field, in the region of the strip 34, below that necessary to reach saturation. Thus, if switch 38 is closed, coil 36 acts as a shield or mask between response strip 34 and the primary electromagnetic field. Strip 34 is isolated from the influence of the electromagnetic field. There will be no signal or "blip" caused by abrupt saturation of the strip 34. Consequently, the primary electromagnetic field is not affected. No impulse signal is added to the oscillating primary field signal, as would be the case if the switch 38 and circuit to coil 36 were open. Consequently, a graphical representation of the field in this condition would look similar to that when no tag was present (see FIG. 4).

The tag 14 according to the invention thus allows certain impulse signals to be added to particular half cycles of the field. Thus, the presence of a specific tag 14 in the field results in a specific train of tag impulses being superimposed on the field oscillations. This function is accomplished by opening and closing of switch 38 and the circuit to coil 36 in a predetermined sequence, which sequence defines the identification code of tag 14. As explained below, the sequence for the opening and closing of switch 38 is controlled by the positioning of diodes in matrix 56.

The operation of matrix 56 in conjunction with counter chip 50 and selector chip 66 is explained with reference to the embodiment illustrated in FIG. 3. It will be appreciated that such embodiment represents only one identification code pattern out of a multiplicity of possible patterns. It will also be appreciated that the number of possible code patterns is dependent on the number of column lines and counter chip output terminals and the number of row lines and selector chip input terminals. Although in the illustrated embodiment there are nine column lines and eight row lines, the principle of the invention may be applied with varying numbers of column lines and row lines. It will also be appreciated that although chip 50 counts by tens and chip 66 counts by eights, other chips counting by other numbers may also be used.

Other circuits might be used in place of the matrix. For example a ring counter, or a series of ring counters (not shown), could be used in place of the matrix. The circuitry might be more complex to achieve a large number of unique codes, but in some circumstances this might be acceptable.

For the purposes of this description, it is assumed that the first switch of counter chip 50 to be closed is the switch connecting voltage drain terminal 46 to counter chip output terminal 52a. It is also assumed that the first switch of selector chip 66 to be closed is the switch connecting selector chip input terminal 68a to selector chip output terminal 70.

As the switch to terminal 52a is closed, the voltage drain signal is passed to column line 54a and through diode 62aa to row line 58a and terminal 68a. Because column line 54a and row line 58a are not connected to any other column lines 54 or row lines 58, the voltage drain signal does not reach any other terminal 68. As the switch between terminal 68a and terminal 70 is closed, the voltage drain signal passes to switch 38 and the circuit to coil 36 is closed. Thus strip 34 is masked and does not affect the field during such half cycle. As a second half cycle of the field commences, the clock signal opens the terminal 52a switch and closes the terminal 52b switch, energizing column line 54b.

Column line 54a is no longer connected to voltage drain terminal 46. Consequently, row line 58a is no longer energized via diode 62aa. Because there is no diode connection between column line 54b and row line 58a, row line 58a is no longer energized at all. However, there is a diode 62cb connecting column line 54b and row line 58c. Thus, row line 58c and terminal 68c are energized by the voltage drain signal. However, because only the switch between terminals 68a and 70 is open, the signal at terminal 68c is not passed to switch 38. Thus the circuit to coil 36 is open and strip 34 reacts to add an impulse signal to the second half cycle of the field.

Similarly, the third half cycle adds an impulse to the field signal.

On the fourth half cycle, row line 58a is again energized, but through diode 62ad. A voltage drain signal is passed to terminal 70 and switch 38 is closed. No. impulse is added to the field signal.

On the fifth to ninth half cycles impulses are added to the field signal.

On the tenth half cycle, the switch between terminal 52j and voltage drain terminal 46 closes, thus sending a signal to index terminal 64. Such signal causes the terminal 68a switch to open and the terminal 68b switch to close. No other action occurs, thus on every tenth half cycle no signal passes to switch 38 and an impulse signal is added to the field signal.

On the eleventh half cycle, the terminal 52a switch closed for a second time, thus energizing column line 54a a second time. Again, the voltage drain signal is passed through diode 62aa to row line 58a. However, now the terminal 68a switch is open, thus no signal can reach switch 38 and an impulse is added.

On the twelfth to fourteenth half cycles, no signals reach switch 38.

On the fifteenth half cycle, column line 54e is energized as is row line 58b via diode 62be. Because the terminal 68b switch is closed, the voltage drain signal is passed to switch 38 and coil 36 is closed. Thus, the fifteenth half cycle of the field possesses no added impulse.

Similarly, on the sixteenth half cycle, column line 54f is energized, as is row line 58b via diode 62bf. Thus, the sixteenth half cycle of the field possesses no added impulses.

Figure 6:
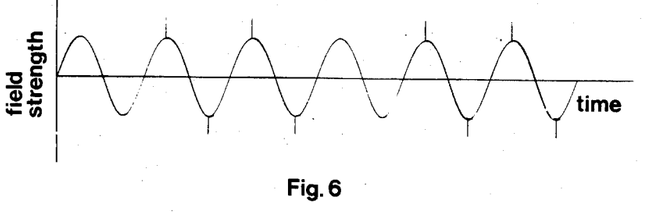
FIG. 6 is a graphical representation of the electromagnetic field during passage of a tag according to the invention; and, FIG. 7 is a schematic representation of a portion of an alternate embodiment.

With each further half cycle, the electronic switches of counter chip 50 and selector chip 66 continue to open and close. A train of impulses passes it switch 38 in the fashion described above. A corresponding train of impulses or "blips" is superimposed on the primary field. The initial half cycles of such primary field are illustrated in FIG. 6. After the final half cycle, corresponding to the closed position of the column line 53i switch and of the input terminal 68h switch, the entire impulse train of "blips" will be repeated. Thus, tag 14 will continue to generate its particular impulse train and affect the electromagnetic field for as long as tag 14 is within the field, that is, passing through or near gate 16.

Figure 7:
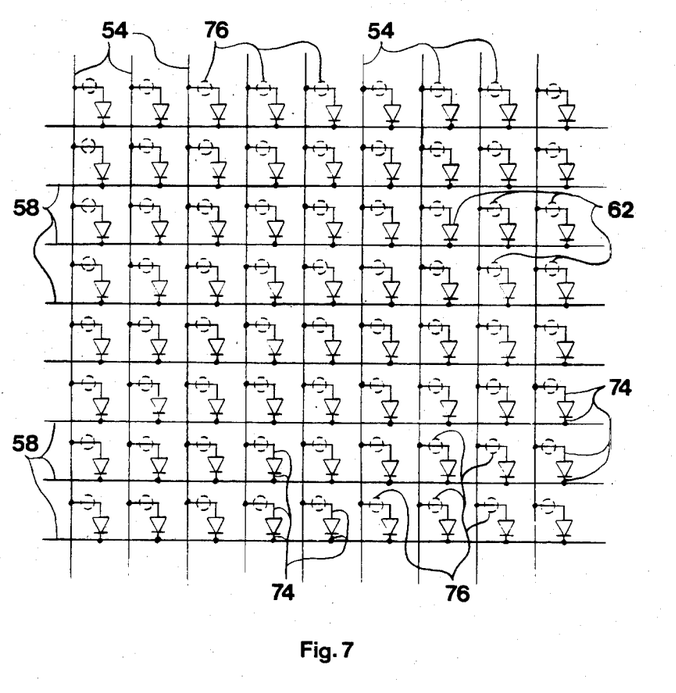

By positioning diodes 62 in different positions in matrix 56, different impulse trains may be generated. For any given number of counter clip output terminals and of selector chip input terminals, the number of possible identification codes which may be utilized are determined by the following relationship:
where
  N=2 mn
  N=number of possible codes
  n=number of matrix column lines
  m=number of matrix row lines Diodes 62 may be installed within matrix 56 to define a particular code at the time tag 14 is manufactured. It may also be possible to allow the operator to choose his own codes. In this case, the manufacturer will manufacture a tag 14 in which diodes 62 are installed to connect each column line 54 with each row line 58 (see FIG. 7). In such an embodiment, each line 74 from a column line 54 to a diode 62 and a row line 58 is provided with a removable electrical connection 76. Such a connection 76 may be easily removed or broken by the the operator, thus preventing an electrical connection between a particular column line and a particular row line. The removal or breaking of connections 76 thereby defines an identification code. In such an embodiment it may be necessary to increase the physical size of tag 14 in order to allow sufficient space for the operator to conveniently remove or break particular connections.

In a further embodiment it may be possible for tag 14 to include a control strip (not shown) of ferromagnetic material in proximity to strip 34. Such a control strip may be used to deactivate the identification capabilities of tag 14. Such control strips are well known in the art (for example see U.S. Pat. No. 4,222,517). The ferromagnetic material of the control strip has a coercivity significantly greater than that of strip 34. The material of the control strip may conveniently be a ferromagnetic alloy of iron, cobalt, and vanadium (commonly referred to as vicalloy). After the control strip is magnetized in a deactivation unit, the control strip prevents the reversal of the magnetic polarization of strip 34 under the influence of the electromagnetic field. In such a condition, tag 14 cannot emit a unique identification code.

It will be appreciated that an identification tag according to the invention may be used not only in material handling applications, but also in any other application where identification of objects or personnel is required. For instance, without limiting the generality of the foregoing, an identification tag may be conveniently used for livestock identification. A tag may be affixed to an animal at birth. Breeding, feeding, health treatment and other information may be more conveniently recorded with the automatic identification of the animal concerned. A tag may even remain with an animal carcass after the animal has been slaughtered. Thus, meat buyers may be provided with a reliable means of identifying and obtaining the history of an animal.

Identification tags according to the invention may be used in personnel identification and security systems. A computer connected to a series of interrogation gates placed within a high security area may record the path of an individual through such area. Certain doors may be locked or unlocked by the computer according to whether an individual is authorized to pass through such door.

The tag may also be used to identify library books, or files in an automated filing system. The gates 16 may be fabricated on a reduced scale and used as a "tag reader". In this way security of filing systems could be increased. Handling of files in a computerised word processing or accounting facility could be automated to a much higher degree.

It will be appreciated that although an identification tag according to the invention has been described using solid state or electronic circuitry, other electrical parts or components may be used without departing from the principle of the invention. Such a embodiment may have application where small tag size is not a requirement.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An identification system for use in association with a set of objects, such as persons, animals, packages or the like, whereby any member of said set may be identified while said member is located within a predetermined interrogation zone, wherein said system comprises:

interrogation field means whereby at least one oscillating electromagnetic interrogation field may be established in said interrogation zone;
  response signal detection means operable to monitor said interrogation zone;
  an identification tag associated with each member of said set, each tag comprising;
  a response member formed of a magnetically permeable material adapted to reach saturation abruptly at a predetermined level of magnetic flux and responsive to half cycles of said interrogation field when present in said interrogation zone, upon abrupt magnetic saturation thereof, to abruptly distort said field thereby generating a series of field distortion pulses corresponding to successive half cycles of said interrogation field and detectable during said half cycles;

an electromagnetic masking coil around the said response member selectively operable to magnetically mask the same and thereby prevent saturation of said response member and adapted to be rendered inoperable whereby no such masking takes place;

switch means in circuit with said masking coil selectively operable during a half cycle to control said masking coil;

circuitry means connected with said switch means and operable to control opening and closing of said switch means according to a predetermined sequence in timed relation to said half cycles of said interrogation field thereby establishing during the presence of said interrogation field a series of interrogation field distortion pulses caused by abrupt saturation of said response member, said series of interrogation field distortion pulses being interrupted by a unique series of discontinuities in said series of distortion pulses which defines an identification code for said tag;

power means for said circuitry means whereby the same may be operated, and, signal processing means connected to said detection means for processing and decoding said series of distortion pulses.

2. An identification system of claimed in claim 1 wherein said power means is responsive to said interrogation field to generate power therefrom, for said circuitry means.

3. An identification system as claimed in claim 1 wherein said system further includes a computer connected to said response signal detection means whereby information concerning the identified member of said set may be stored.

4. An identification tag to be used in association with an object such as a person, animal, package or the like to be identified, and an identification system which system establishes an oscillating electromagnetic interrogation field within a predetermined interrogation zone, said tag comprising, a response signal member responsive to said continuous interrogation field to abruptly reach magnetic saturation thereby generating a series of response signal pulses corresponding to successive half cycles of said interrogation field and detectable during said half cycles, electromagnetic masking coil means around said response signal member selectively operable to magnetically mask the same and adapted to be rendered inoperable whereby no such masking takes place, switch means in circuit with said masking coil means, and selectively operable during a said half cycle to control said masking coil means, electronic circuitry means connected with said switch means and operable to control the opening and closing of said switch means according to a predetermined sequence in timed relation to the oscillations of said interrogation field thereby establishing during the presence of said interrogation field a series of response signal pulses generated by said response signal member, said series being interrupted by selective operation of said masking coil means to produce a unique sequence of discontinuities in said series of response signal pulses, which sequence defines an identification code for said tag, and, power means to power said circuitry means.

5. An identification tag as claimed in claim 4 wherein said power means is responsive to said interrogation field to generate power therefrom, for said circuitry means.

6. An identification tag as claimed in claim 4 wherein said power means comprises:

a rectifier and voltage stabilizer circuit, connected to said power means, said rectifier and voltage stabilizer circuit defining a more or less constant voltage signal, and a clock signal, said clock signal defining essentially a series of pulses corresponding to said half cycles of said electromagnetic field;

and wherein said electronic circuitry means comprises:

an integrated circuitry counter receiving said voltage and clock signals and having at least two counter output terminals whereby said voltage may be passed to a different counter output terminal with each said pulse of said clock signal;

an identification code matrix comprising a grid of at least two electrically insulated column lines and at least two electrically insulated row lines, in which a particular column line may be electrically connected to a particular row line via a diode, whereby the positioning of said diodes in said grid defines an identification code, each said column line being electrically connected to a respective counter output terminal, and each said row line defining a matrix output terminal;

an integrated circuitry data selector having at least two counter input terminals, a selector output terminal, and at least two matrix input terminals, each said matrix input terminal being electrically connected to a respective one of said matrix output terminals, each said counter input terminal being electrically connected to a respective one of said counter output terminals, whereby a different said matrix input terminal may be electrically connected to said selector output terminal each time said voltage signal appears at a said counter input terminal;

said switch means being electrically connected to said selector output terminal whereby each time said voltage signal appears at said selector output terminal said switch means will close.

7. An identification tag as claimed in claim 6 wherein said matrix includes diodes connecting each said column line to each said row line, and breakable electrical connection associated with each said diode whereby an operator may break particular breakable electrical connections thereby defining an identification code.

8. A method for identifying each member of a set of objects such as persons, animals, packages or the like said method comprising:

establishing a continuous oscillating interrogation field, at an interrogation zone;

providing each said member of said set with an identification tag, said tag comprising a response signal member responsive to continuous oscillations of said interrogation field to abruptly reach magnetic saturation on each half cycle thereby generating a series of response signal pulses corresponding to successive half cycles of said interrogation field and detectable during said half cycles, and further comprising masking coil means around said response signal member, switch means in circuit with said masking coil means, whereby said masking coil means is selectively operable by said switch means to mask said response signal member during the presence of a said half cycle of said interrgation field, electronic circuitry means connected with said switch means and operable to control opening and closing of said switch means according to a predetermined sequence in timed relation to the oscillations of said continuous interrogation field thereby establishing during the presence of said continuous interrogation signal a response signal consisting of a series of response signal pulses generated by said response signal member, said series of response signal pulses being interrupted by a unique series of discontinuities in said series of response signal pulses, which sequence defines an identification code for said tag, and said tag having pick up means responsive to said continuous interrogation field to power from said continuous interrogation field, for powering said circuitry means;

placing a member of said set, with a tag, in said continuous interrogation field established in said interrogation zone;

detecting the electromagnetic field in said interrogation zone whereby to detect said sequence of response signals in the presence of said continuous interrogation field; and, processing and decoding said sequence of response signals to determine the identity of said tag and said member of said set.

* * * * *